(12) United States Patent
Martens et al.

(10) Patent No.: US 10,240,519 B2
(45) Date of Patent: Mar. 26, 2019

(54) VARIABLE TURBINE AND/OR COMPRESSOR GEOMETRY FOR AN EXHAUST GAS TURBOCHARGER

(71) Applicant: Bosch Mahle Turbo Systems GmbH & Co. KG, Stuttgart (DE)

(72) Inventors: Anatolij Martens, Eislingen (DE); Volkhard Ammon, Pliezhausen (DE)

(73) Assignee: BMTS Technology GmbH & Co. KG (DE)

( * ) Notice: Subject to any disclaimer, the term of this patent is extended or adjusted under 35 U.S.C. 154(b) by 636 days.

(21) Appl. No.: 14/852,178

(22) Filed: Sep. 11, 2015

(65) Prior Publication Data

US 2016/0076439 A1 Mar. 17, 2016

(30) Foreign Application Priority Data

Sep. 12, 2014 (DE) .................. 10 2014 218 342

(51) Int. Cl.
*F01D 17/16* (2006.01)
*F02B 37/24* (2006.01)
(Continued)

(52) U.S. Cl.
CPC .............. *F02B 37/24* (2013.01); *F01D 17/16* (2013.01); *F01D 17/165* (2013.01);
(Continued)

(58) Field of Classification Search
CPC ........ F01D 17/16; F01D 17/165; F02B 37/24; F04D 29/462
See application file for complete search history.

(56) References Cited

U.S. PATENT DOCUMENTS 8,021,106 B2 * 9/2011 Battig .................. F01D 17/165
415/160
2004/0109761 A1 6/2004 Scherrer
(Continued)

FOREIGN PATENT DOCUMENTS

DE 102012017325 A1 3/2014
DE 102012108975 A1 3/2014
(Continued)

OTHER PUBLICATIONS

Chinese Office Action dated Aug. 24, 2017 corresponding to related Chinese Patent Application No. 201510515091.7.
(Continued)

*Primary Examiner* — Richard Edgar
*Assistant Examiner* — Michael Sehn
(74) *Attorney, Agent, or Firm* — Fishman Stewart PLLC

(57) ABSTRACT

At least one of a variable turbine geometry and a variable compressor geometry for an exhaust gas turbocharger may include a housing including a first housing wall and a blade bearing ring having at least one guide blade rotatably mounted thereon. A control lever may be included for adjusting the at least one guide blade between a closing position and an opening position. An actuating shaft may be connected to the control lever in a rotationally fixed manner along a rotation axis. The actuating shaft may be rotatably mounted on the housing via a passage opening disposed in the first housing wall. The actuating shaft may directly support itself on the first housing wall in the passage opening.

16 Claims, 2 Drawing Sheets

(51) Int. Cl.
*F04D 29/46* (2006.01)
*F04D 29/056* (2006.01)
*F01D 25/24* (2006.01)
*F01D 25/16* (2006.01)
*F02B 33/40* (2006.01)

(52) U.S. Cl.
CPC ........ *F04D 29/056* (2013.01); *F04D 29/462* (2013.01); *F01D 25/16* (2013.01); *F01D 25/24* (2013.01); *F02B 33/40* (2013.01); *F05D 2220/40* (2013.01); *F05D 2240/12* (2013.01); *F05D 2250/132* (2013.01); *Y02T 10/144* (2013.01)

(56) References Cited

U.S. PATENT DOCUMENTS

2010/0196146 A1* 8/2010 Wengert ............... F01D 17/165 415/163
2010/0209232 A1* 8/2010 Stein .................... F01D 17/165 415/148
2010/0290895 A1* 11/2010 Ahrens ................ F01D 17/165 415/148
2011/0014033 A1* 1/2011 Boning ................ F01D 17/165 415/148

FOREIGN PATENT DOCUMENTS

| EP | 0226444 A2 | 6/1987 |
| EP | 1426563 A1 | 6/2004 |
| JP | 2001132464 A | 5/2001 |
| WO | WO-2014044364 A1 | 3/2014 |
| WO | WO-2014/105378 A1 | 7/2014 |

OTHER PUBLICATIONS

German Search Report for DE-102014218342.1, dated Jun. 9, 2015.
English abstract for DE-102012017325.

* cited by examiner

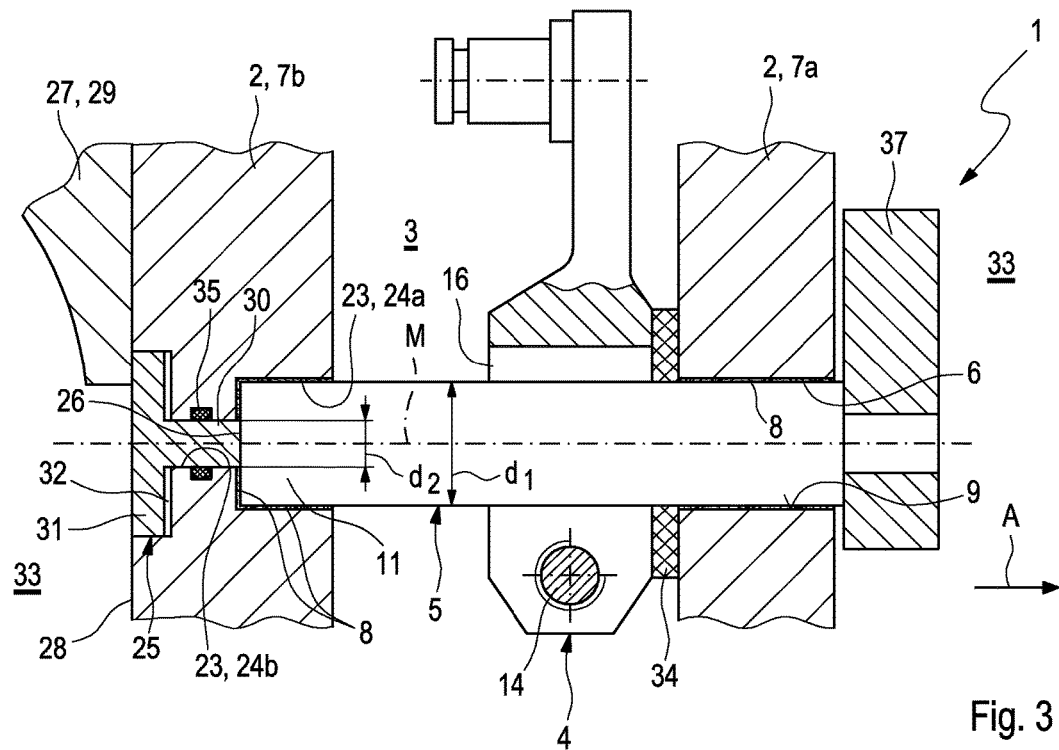
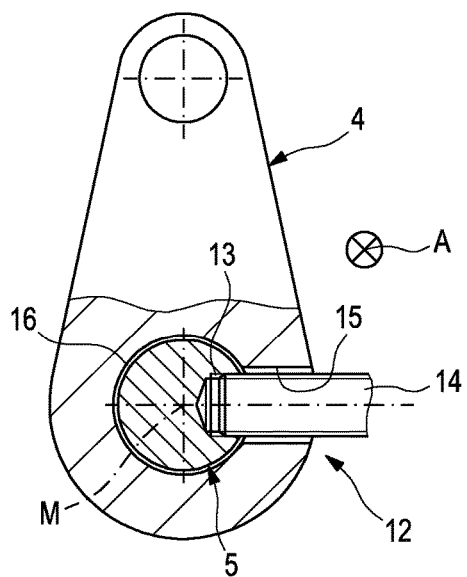
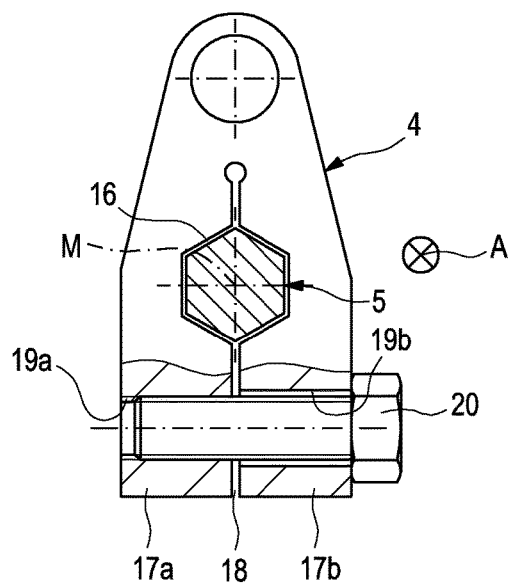
Fig. 3
Fig. 4
Fig. 5

VARIABLE TURBINE AND/OR COMPRESSOR GEOMETRY FOR AN EXHAUST GAS TURBOCHARGER

CROSS-REFERENCE TO RELATED APPLICATIONS

This application claims priority to German Patent Application No. 10 2014 218 342.1, filed Sep. 12, 2014, the contents of which are hereby incorporated by reference in its entirety.

TECHNICAL FIELD

The invention relates to a variable turbine and/or compressor for an exhaust gas turbocharger and an exhaust gas turbocharger having such a variable turbine and/or compressor geometry.

BACKGROUND

For regulating the turbine or compressor output in an exhaust gas turbocharger, fluid-flow machines with a so-called variable turbine respectively compressor geometry are employed, which allow a variation of the inflow of a fluid such as for example exhaust gas or fresh air to the impeller of the fluid flow machine by means of adjustable guide blades. Such adjustability allows optimal adaptation of the fluid flow onto the impeller as a function of the fluid quantity entering at the moment. Adjusting the guide blades into an opening position with maximum flow cross section for the instance of a large quantity of exhaust gas or fresh air ensures that the gas molecules do not impinge on the impeller with too high a velocity. However, when the fluid quantity entering the fluid-flow machine decreases, for example because the internal combustion engine connected upstream of the turbocharger happens to be operated with low rotational speed at that time, adjusting the guide blades into a closing position with minimal flow cross section results in the gas molecules being accelerated. As a result, fewer gas molecules impinge on the impeller, however with increased velocity to that the impeller of the fluid-flow machine is accelerated.

For adjusting the guide blades between their opening and closing position, actuating devices, typically in the manner of actuating levers, are often used, which are directly or indirectly coupled—for example via a so-called adjusting ring—to the rotatable guide blades. For moving the actuating device designed as actuating lever it is opportune to connect the same to an actuator lever via a so-called actuating shaft in a rotationally fixed manner. By means of the actuator lever, which in turn can be drive-connected to an electric actuator, the actuating lever can thus be moved between the opening and the closing position. With conventional variable turbine and/or compressor geometries, the actuating shaft is usually at least partly in a bearing bushing provided on the guide blade support ring or on the housing and is rotatably mounted in the same. A variable turbine geometry constructed in this manner is known for example from EP 0 226 444 B1.

SUMMARY

It is now an object of the present invention to create an improved embodiment for a variable turbine and/or compressor geometry which compared with conventional variable turbine and/or compressor geometries is characterized by reduced production costs.

Accordingly, the basic idea of the invention is to not rotatably mount the actuating shaft for adjusting the guide blades with the help of a component—typically a bearing bushing or similar—attached to the housing in a fixed manner on the housing, but to entirely do without such an additional component. In other words, the control lever according to the invention is directly mounted on the housing. To this end, a suitably dimensioned passage opening is provided on the housing in which the actuating shaft can be rotationally adjustably received relative to the housing. This results in the desired direct supporting of the actuating shaft on the housing.

Since with the variable turbine respectively compressor geometry according to the invention a conventional bearing bushing or a similar component that is designed separately to the housing is omitted, elaborate assembly of the bearing bushing in the housing is also omitted, for example by means of pressing in. This results in substantially reduced production costs in the manufacture of the variable turbine respectively compressor geometry.

A variable turbine and/or compressor geometry for an exhaust gas turbocharger according to the invention has a suitably dimensioned housing delimiting a housing interior. The variable turbine and/or compressor geometry comprises a blade bearing ring, on which a plurality of guide blades is rotatably mounted. For adjusting the guide blades between a closing position and an opening position, a control lever is provided. Connected to this control lever in a rotationally fixed manner is an actuating shaft, which is rotatably mounted on the housing and for the rotatable mounting is at least partly received in a passage opening, which in turn is formed in a first housing wall of the housing. According to the invention, the actuating shaft supports itself within the passage opening directly on the first housing wall.

In a preferred embodiment, a protective coating can be provided on a wall section of the first housing wall delimiting the passage opening. Such protective coating improves the resistance of the housing to wear manifestations, which due to friction because of the rotation of the actuating shaft relative to the housing can occur in a more or less pronounced form.

Particularly practically, the protective coating can contain carbon and nitrogen. For producing such a protective coating a thermochemical method known as "nitrocarburizing" to the person skilled in the art is recommended. With this method, the surface of the housing is enriched with nitrogen and carbon. This results in an abrasion-resistant nitrided layer, which in turn comprises a connecting layer and a diffusion layer.

In another preferred embodiment, the housing has a second housing wall located opposite the first housing wall, which together with the first housing wall partly delimits the housing interior. In the second housing wall, a recess is provided, which with respect to a top view from the outside onto the first housing wall is aligned with the passage opening provided in the first housing wall. Thus, the actuating shaft cannot only support itself within the passage opening on the first housing wall but with an axial end section received in the recess, additionally also on said second housing wall. In any case, the actuating shaft supports itself directly on the respective housing wall.

In order to increase the lifespan of the variable turbine and/or compressor geometry it proves to be advantageous to provide the already explained protective coating on the side of the housing facing the housing interior also in the region of the recess formed in the second housing wall. It is clear that the protective coating also in this case—just as the protective coating in the region of the passage opening—can contain carbon and nitrogen. In this way it can be ensured that a wear-resistance protective coating is present on all bearing points of the actuating shaft on the housing. This leads to reduced wear in the actuating shaft and in those sections of the housing, on which the actuating shaft mechanically comes into contact with the housing.

For the stable fixing of the actuating shaft along an axial direction defined by the centre longitudinal axis of the actuating shaft it is proposed to design and dimension the recess provided in the second housing wall in such a manner that it acts as axial stop for the actuating shaft for a movement along its centre longitudinal axis to the second housing wall of the housing.

In an advantageous further development, the control lever can be fastened to the actuating shaft in a rotationally fixed manner by means of a clamping connection, by means of a screw connection or by means of a press connection.

In order to prevent axial movement of the actuating shaft within the housing—mostly caused through axial play of the actuating shaft in the housing due to tolerances—it is proposed in another preferred embodiment of the invention to arrange a spring-elastic element in the interior. For preloading the control lever towards the first housing wall, the same can support itself on the second housing wall on the one hand and on the control lever on the other hand.

In an advantageous further development of this embodiment, the spring-elastic element can be or comprise a coil spring, which is arranged coaxially to the centre longitudinal axis of the actuating shaft and wraps the actuating shaft spirally radially on the outside. In this way the spring-elastic element can be attached to the actuating shaft in a space-saving manner. Alternatively to such a coil spring, the use of a suitably designed spiral spring, a wave spring or a disc spring is also conceivable.

In another preferred embodiment, a bearing disc acting as sealing element can be provided between control lever and second housing wall, which seals the housing interior in the region of the passage opening against the outer surroundings of the housing.

In a further preferred embodiment, the recess provided in the second housing wall can also be a passage opening, which fluidically connects the housing interior to the outer surroundings of the housing and in a first axial section facing the housing interior has a first opening diameter. This first axial section, moving away from the housing interior, merges into a second axial section with a second opening diameter that is smaller than the first opening diameter. The actuating shaft with this version is received in the first axial section. In the second axial section, a preload element can be received which—analogous to the spring-elastic element in the housing interior, for preloading the actuating shaft against the first housing wall at one end and on a face end of the actuating shaft assigned to the second housing wall. At the other end, the preload element can support itself on a housing wall of a compressor/turbine housing, which on a side of the second housing wall facing away from the housing interior can abut the same. In this way, a preload of the actuating shaft towards the first housing wall can also be achieved. In contrast with the spring-elastic element introduced above, the preload element is not arranged within the housing in the housing interior but outside the housing. Consequently the preload element is particularly easily accessible to a worker.

As particularly practical in terms of design proves to be an advantageous further development of the embodiment explained above, with which the preload element is designed stamp-like. A preload element with such a geometrical configuration comprises a stamp shaft, which is arranged in the second axial section of the passage opening. This stamp shaft, moving away from the actuating shaft, merges into a stamp section which is received in a recess that is complementary to the stamp section. This recess is provided on the side of the second housing wall facing away from the housing interior.

The invention furthermore relates to an exhaust gas turbocharger with a turbine and/or compressor geometry introduced above.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
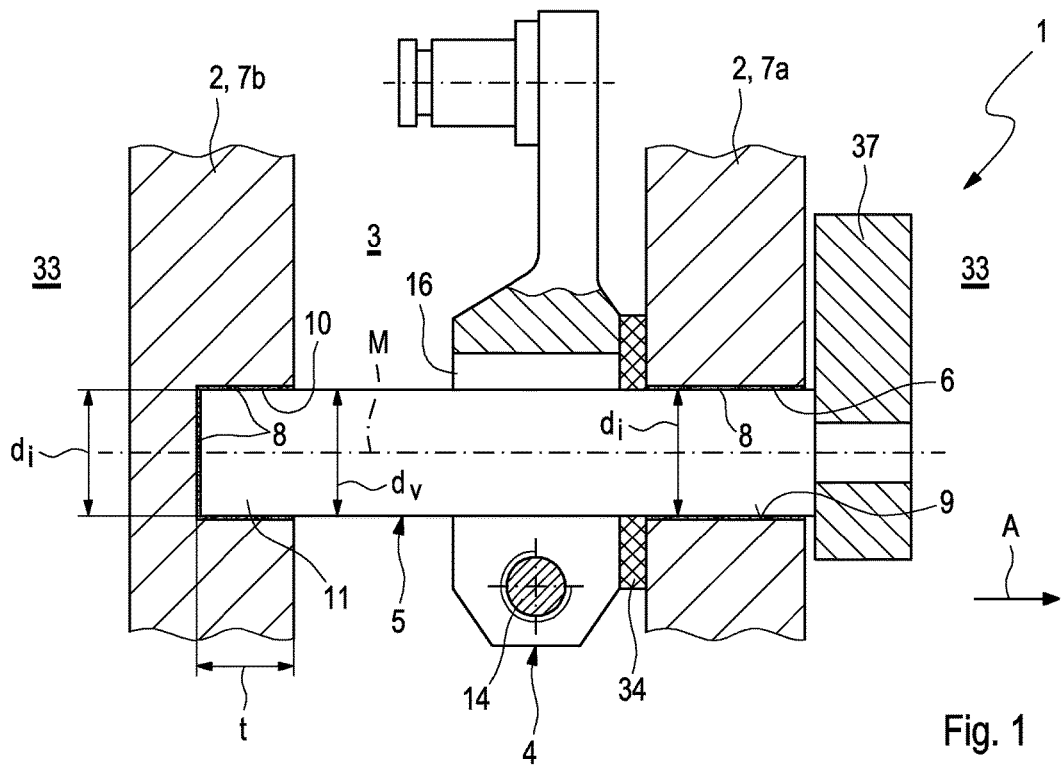
FIG. 1 an example of a variable turbine and/or compressor geometry according to the invention in a longitudinal section, FIG. 2 a first variant of the example of FIG. 1, FIG. 3 a second variant of the example of FIG. 1, FIG. 4 a detail representation of the control lever of the FIGS. 1 to 3, which is fastened to the actuating shaft by means of a screw connection, FIG. 5 a further detail representation of the control lever of the FIGS. 1 to 3, which is fastened to the actuating shaft by means of a clamping connection.

FIG. 1 shows in a longitudinal section an example of a variable turbine and/or compressor geometry 1 according to the invention. The same comprises a housing 2 delimiting a housing interior 3, which housing 2 comprises a first housing wall 7a and a second housing wall 7b located opposite the first housing 7a. The variable turbine and/or compressor geometry 1 also comprises a blade bearing ring, on which a plurality of guide blades is rotatably mounted (not shown). For adjusting the guide blades between their opening and closing position, the variable turbine and/or compressor geometry comprises an actuating device in the form of an actuating lever 37, which is coupled to the rotatable guide blades for their adjustment between the opening and closing position via an adjusting ring (not shown) that is mounted on the housing. For moving the actuating lever 37, the same is connected to an actuating shaft 5 in a rotationally fixed manner. The variable turbine and/or compressor geometry 1 furthermore comprises a control lever 4 that is connected to the actuating shaft 5 in a rotationally fixed manner, which in turn can be drive-connected to an electric actuator (not shown). The actuating shaft 5 has a centre longitudinal axis M, through the position of which an axial direction A of the actuating shaft 5 is determined. For rotationally fixing the control lever 4 on the actuating shaft 5, a suitably dimensioned break-through 16 can be provided in the control lever 4, which is engaged through by the actuating shaft 5.

Corresponding to FIG. 4, the control lever 4 can be fixed on the actuating shaft 5 in rotationally fixed manner by means of a screw connection 12. Such a screw connection 12 can comprise a threaded bore 13 provided in the actuating shaft 5, which is aligned with a passage opening 15 provided in the control lever 4. For fixing the control lever 4 on the actuating shaft 5, a threaded screw 14 is used.

FIG. 5 shows a variant that is alternative to the scenario of FIG. 4 for the rotationally fixed fastening of the control lever 4 on the actuating shaft 5 with the help of a clamping connection. In this case, the control lever 4 can be equipped with two pincer-like end sections 17a, 17b, which in each case partly form a break-through 16 for receiving the actuating shaft 5 and between which a gap-like intermediate space 18 is additionally formed. In the end section 17a, a threaded bore 19a is provided, in the end section 17b a conventional bore aligned with the threaded bore 19a, which is aligned with the threaded bore 19a. By screwing a threaded screw 20 through the bore 19b into the threaded bore 19a, the two end sections 17a, 17b are pressed against one another and in this way pressed against the actuating shaft 5 so that the desired clamping effect is achieved. With the variant of FIG. 5 for both the actuating shaft 5 and also for the break-through 16, a non-rotation symmetrical geometry such as for example the geometry of a polygon in the form of a hexagon—exemplarily shown for example in FIG. 5—is recommended in the cross section perpendicularly to the centre longitudinal axis M. Alternatively or additionally to the screw respectively clamping connections shown in the FIGS. 4 and 5, fastening the actuating shaft 5 on the control lever 4 by means of pressing is also conceivable, in particular in connection with the non-rotation-symmetrical geometry of actuating shaft 5 and break-through 16 mentioned above. In this case, the screws 14 and 20 can be omitted.

With conventional variable turbine and/or compressor geometries, the actuating shaft 5 is usually at least partially received in a bearing bushing attached to the blade bearing ring or on the housing 2 and rotatably mounted in the same. As illustrated in FIG. 1, the actuating shaft 5 with the variable turbine and/or compressor geometry 1 according to the invention by contrast is rotatably mounted directly on the housing 2. To this end, the actuating shaft 5 is at least partly received in a passage opening 6, which is formed in the first housing wall 7a of the housing 2. As is further evident from FIG. 1, the actuating shaft 5 supports itself within the passage opening 6 directly—i.e. without using a bearing bushing or a similar component that is connected to the housing 2 in a fixed manner—on the first housing wall 7a. In the second housing wall 7b on the inside a recess 10 is provided, which is aligned with the passage opening 6 provided in the first housing wall 7a. The actuating shaft 5 is received in the recess 10 with an axial end section 11 and rotatably mounted in the same. This means that the actuating shaft 5 supports itself not only within the passage opening 6 on the first housing wall 7a, but within the recess 10 also on the second housing wall 7b. In both cases, the actuating shaft 5 supports itself directly on the two housing walls 7a, 7b. Preferably, an inner diameter $d_i$ of the passage opening 6 and of the recess 10 in each case corresponds to a shaft diameter $d_v$ of the actuating shaft 5.

On a wall section 9 of the first housing wall 7a delimiting the passage opening 6 and—alternatively or additionally to this—in the region of the second housing wall 7b delimiting the recess 10, a protective coating 8 can be provided which improves the resistance of the housing 2 to abrasion and wear. The protective coating 8 can be applied onto the wall section 9 and optionally also onto further regions of the housing 2 by means of "nitrocarburising" and contain carbon and nitrogen. The recess 10, in particular its recess depth t, is dimensioned and designed in the example scenario in such a manner that it acts as axial stop for the actuating shaft 5 for a movement along the centre longitudinal axis M towards the second housing wall 7b of the housing 2.

Figure 2:
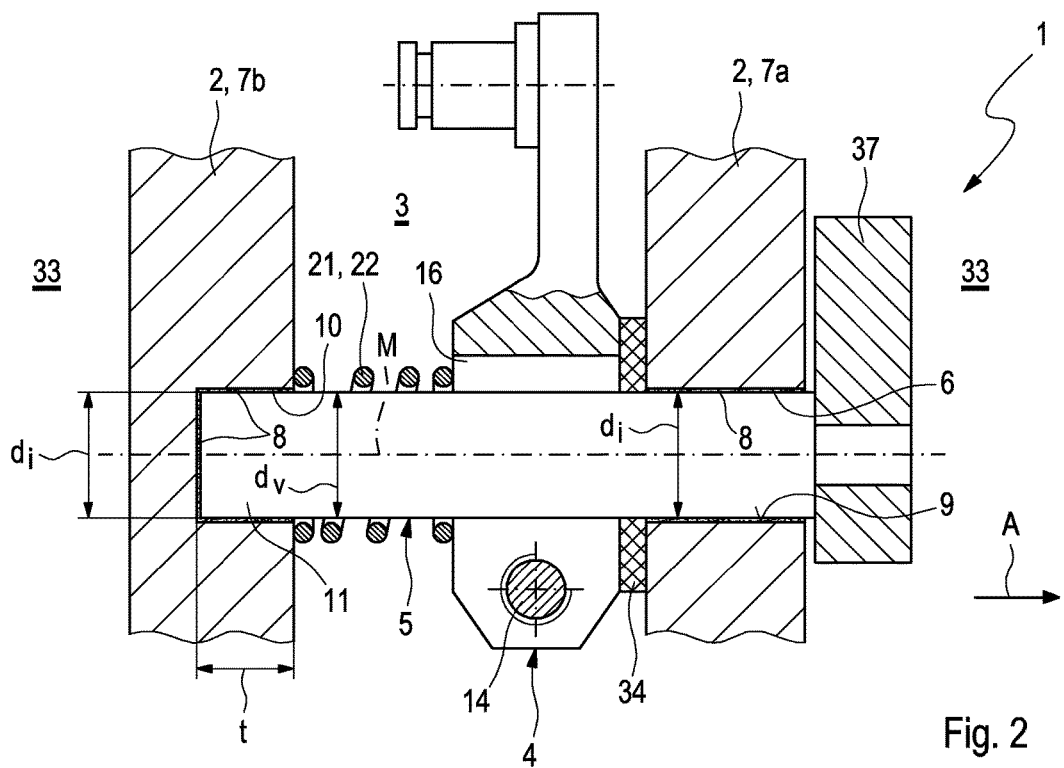

The FIG. 2 shows a variant of the example of FIG. 1. In order to prevent axial movement of the actuating shaft 5 within the housing 2, brought about for example through axial play of the actuating shaft 5 in the housing 2 due to tolerances, a spring-elastic element 21 is arranged in the housing interior 3, which preloads the control lever 4 and thus also the actuating shaft 5 that is fixed on the control lever 4 in a rotationally fixed manner towards the first housing wall 7a. To this end, the spring-elastic element 21 supports itself on the one end on the second housing wall 7b and on the other end on the control lever 4. As is schematically shown in FIG. 2, the spring-elastic element 21 can be or comprise a coil spring 22, which is arranged coaxially to the centre longitudinal axis M of the actuating shaft and radially wraps the actuating shaft 5 on the outside. In variants of the example, a suitable spiral spring, wave spring or disc spring can also be used instead of a coil spring.

With a further version of the example of FIG. 1 shown in FIG. 3, the recess 10 provided in the second housing wall 7b is also designed in the form of a passage opening 23. Such a passage opening 23 has a first opening diameter $d_1$ in a first axial section 24a facing the housing interior 3, which corresponds to the inner diameter $d_i$ of the recess 10 in the example of the FIGS. 1 and 2. The first axial section 24a of the passage opening 23 moving away from the housing interior 3 merges into a second axial section 24b with a second opening diameter $d_2$, that is smaller than the first opening $d_1$. The actuating shaft 5 is received in the first axial section 24a. In the second axial section, a preload element 25 is arranged, which for preloading the actuating shaft 5 against the first housing wall 7a supports itself on the one end on a face end 26 of the actuating shaft 5 facing the second housing wall 7b. On the other end, the preload element 25 can support itself on a housing wall 27 of a compressor/turbine housing 29. The compressor/turbine housing 29 abuts the second housing wall 7b on a side 28 of the same facing away from the housing interior 3. In this way, a preload of the actuating shaft 5 towards the first housing wall 7a can be achieved. In addition to this, the preload element 25 following disassembly of the housing 2 from the compressor/turbine housing 29 is particularly easily accessible to a worker.

The preload element 25, as shown in FIG. 3, can be designed stamp-like and comprise a stamp shaft 30, which is arranged in the second axial section 24b of the passage opening 23. This stamp shaft 30 moving away from the actuating shaft 5 merges into a stamp section 31 which is received in a recess 32 that is complementary to the stamp section 31 and formed on the side 28 of the second housing wall 7b facing away from the housing interior and protrudes over the second housing wall 7b for as long as the compressor/turbine housing 29 is not mounted on the second housing wall 7b.

For sealing the housing interior 3 against the outer surroundings 33 of the housing 2, a bearing disc 34 acting as sealing element can be provided between control lever 4 and first housing wall 7a in the examples of the FIGS. 1 to 3, which seals an interior space between the actuating shaft 5 and the wall section of the first housing wall 7a of the housing 2 forming the passage opening 6.

The recess 10, as shown in FIG. 3, is also designed as a passage opening 23 so that a receiving groove can be provided in the wall section of the second housing wall 7b delimiting the passage opening 23, in which partly a sealing element 35, for example in the manner of a sealing ring, is received. The sealing element 35 serves for sealing the housing interior 3 against the outer surroundings 33 in the region of the passage opening 33.

The invention claimed is:

1. At least one of a variable turbine geometry and a variable compressor geometry for an exhaust gas turbocharger, comprising:
a housing including a first housing wall having a passage opening extending therethrough;
a blade bearing ring including at least one guide blade rotatably mounted thereon;
a control lever for adjusting the at least one guide blade between a closing position and an opening position;
an actuating shaft connected to the control lever in a rotationally fixed manner along a rotation axis, the actuating shaft arranged in the passage opening of the first housing wall and rotatably mounted on the housing via the passage opening, wherein the actuating shaft supports itself within the passage opening directly on the first housing wall;
the housing further including a second housing wall having a recess disposed axially aligned with the passage opening in the first housing wall with respect to the rotation axis, the second housing wall disposed opposite to the first housing wall such that the second housing wall together with the first housing wall at least partly defines a housing interior;
the recess of the second housing wall provided with a passage opening including a first opening diameter in a first axial section facing the housing interior and extending into a second axial section of the passage opening of the recess in a direction away from the housing interior, the second axial section including a second opening diameter that is smaller than the first opening diameter;
the actuating shaft including an axial end section received in the first axial section and arranged rotatably mounted in the recess, the axial end section of the actuating shaft supporting itself within the recess directly on the second housing wall of the housing; and
a preload element disposed in the second axial section for preloading the actuating shaft against the first housing wall, wherein the preload element is arranged between a face end of the actuating shaft facing the second housing wall and a housing wall of at least one of a compressor housing and a turbine housing, the at least one of the compressor housing and the turbine housing mountable against a side of the second housing wall facing away from the housing interior.

2. The at least one of the variable turbine geometry and the variable compressor geometry according to claim 1, further comprising a protective coating disposed on a wall section of the first housing wall delimiting the passage opening.

3. The at least one of the variable turbine geometry and the variable compressor geometry according to claim 2, wherein the protective coating contains at least one of carbon and nitrogen.

4. The at least one of the variable turbine geometry and the variable compressor geometry according to claim 1, wherein the second housing wall has an inner surface facing towards the housing interior, the inner surface of the second housing wall includes a protective coating disposed in a region of the recess mounting the axial end section of the actuating shaft opposite of the passage opening of the first housing wall.

5. The at least one of the variable turbine geometry and the variable compressor geometry according to claim 1, wherein the recess is configured as an axial stop for stopping the actuating shaft in a movement along a centre longitudinal axis of the actuating shaft in a direction towards the second housing wall of the housing.

6. The at least one of the variable turbine geometry and the variable compressor geometry according to claim 1, wherein the control lever is fixed to the actuating shaft via at least one of a clamping connection, a screw connection and a press connection.

7. The at least one of the variable turbine geometry and the variable compressor geometry according to claim 1, further comprising a spring-elastic element arranged between the second housing wall at one end and the control lever at another end for preloading the control lever towards the first housing wall.

8. The at least one of the variable turbine geometry and the variable compressor geometry according to claim 7, wherein the spring-elastic element includes a coil spring, arranged coaxially to a centre longitudinal axis of the actuating shaft and spirally wraps the actuating shaft radially on an outside of the actuating shaft.

9. The at least one of the variable turbine geometry and the variable compressor geometry according to claim 1, further comprising a bearing disc arranged between the control lever and the first housing wall, the bearing disc configured to seal the housing interior against a surrounding environment of the housing.

10. The at least one of the variable turbine geometry and the variable compressor geometry according to claim 1, wherein the passage opening of the first housing wall defines an inner diameter that corresponds to an outer diameter of the actuating shaft received in the passage opening to facilitate mounting the actuating shaft directly on the first housing wall.

11. An exhaust gas turbocharger, comprising: at least one of a variable turbine geometry and a variable compressor geometry, the at least one of the variable turbine geometry and the variable compressor geometry including:
a housing including a first housing wall and a second housing wall, the first housing wall together with the second housing wall at least partially defining a housing interior;
a blade bearing ring including at least one guide blade rotatably mounted thereon;
a control lever for adjusting the at least one guide blade between a closing position and an opening position; and
an actuating shaft connected rotationally fixed to the control lever and being rotatable along a rotation axis, wherein the actuating shaft is rotatably mounted on the housing via a passage opening disposed in the first housing wall and a recess disposed in the second housing wall, the second housing wall disposed opposite the first housing wall with respect to the rotation axis;
the passage opening of the first housing wall delimited circumferentially to the rotation axis by a wall section of the first housing wall, wherein the actuating shaft supports itself within the passage opening directly on the first housing wall;

the recess of the second housing wall provided with a passage opening including a first axial section having a first opening diameter facing the housing interior that extends into a second axial section of the passage opening of the recess in a direction away from the housing interior, the second axial section having a second opening diameter that is smaller than the first opening diameter, wherein the actuating shaft includes an axial end section received in the first axial section and is supported within the recess directly on the second housing wall of the housing; and a preload element disposed in the second axial section for preloading the actuating shaft against the first housing wall, wherein the preload element is arranged between a face end of the actuating shaft facing the second housing wall and a housing wall of at least one of a compressor housing and a turbine housing, the at least one of the compressor housing and the turbine housing mountable against a side of the second housing wall facing away from the housing interior.

12. The exhaust gas turbocharger according to claim 11, wherein the wall section of the first housing wall has a protective coating disposed thereon to facilitate resistance of the wall section to wear.

13. The exhaust gas turbocharger according to claim 11, further comprising a spring-elastic element arranged between the second housing wall and the control lever, the spring-elastic element configured to preload the control lever towards the first housing wall.

14. The exhaust gas turbocharger according to claim 11, wherein the second housing wall on an inner surface facing towards the housing interior includes a protective coating disposed in a region of the recess.

15. At least one of a variable turbine geometry and a variable compressor geometry for an exhaust gas turbocharger, comprising:

a housing including a first housing wall and a second housing wall disposed opposite the first housing wall that at least partially define a housing interior, the first housing wall including a passage opening extending therethrough and the second housing wall including a recess aligned with the passage opening;

a blade bearing ring including at least one guide blade rotatably mounted thereon;

a control lever for adjusting the at least one guide blade between a closing position and an opening position;

an actuating shaft having a rotation axis rotatably mounted on the housing and connected to the control lever in a rotationally fixed manner, the actuating shaft arranged in the passage opening of the first housing wall and including an axial end section arranged in the recess, wherein the actuating shaft directly supports itself on the first housing wall in the passage opening and on the second housing wall in the recess;

a preload element for preloading the actuating shaft;

wherein the recess of the second housing wall includes a passage opening, the passage opening of the recess including a first axial section having a first opening diameter facing the housing interior and a second axial section disposed away from the housing interior in relation to the first axial section, the second axial section having a second opening diameter that is smaller than the first opening diameter;

wherein the axial end section of the actuating shaft is disposed in the first axial section; and wherein the preload element is disposed in the second axial section for preloading the actuating shaft against the first housing wall, the preload element arranged between a face end of the actuating shaft facing the second housing wall and a housing wall of at least one of a compressor housing and a turbine housing that is mountable against a side of the second housing wall facing away from the housing interior.

16. The at least one of the variable turbine geometry and the variable compressor geometry according to claim 15, wherein the preload element is configured as a stamp element and includes a stamp shaft arranged in the second axial section of the passage opening of the recess, the stamp shaft connected to a stamp section disposed away from the actuating shaft with respect to the stamp shaft, wherein the stamp section is received in a second recess arranged complementary to the stamp section, the second recess disposed on the side of the second housing wall facing away from the housing interior and defining at least part of the passage opening of the recess.

* * * * *